(12) United States Patent
Codrescu et al.

(10) Patent No.: US 9,678,754 B2
(45) Date of Patent: Jun. 13, 2017

(54) SYSTEM AND METHOD OF PROCESSING HIERARCHICAL VERY LONG INSTRUCTION PACKETS

(75) Inventors: Lucian Codrescu, Austin, TX (US); Erich James Plondke, Austin, TX (US); Ajay Anant Ingle, Austin, TX (US); Suresh K. Venkumahanti, Austin, TX (US); Charles Joseph Tabony, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 741 days.

(21) Appl. No.: 12/716,359

(22) Filed: Mar. 3, 2010

(65) Prior Publication Data

US 2011/0219212 A1 Sep. 8, 2011

(51) Int. Cl.
*G06F 9/38* (2006.01)
*G06F 9/30* (2006.01)

(52) U.S. Cl.
CPC ........ *G06F 9/3853* (2013.01); *G06F 9/30149* (2013.01)

(58) Field of Classification Search
CPC .................................................. G06F 9/3853
See application file for complete search history.

(56) References Cited

U.S. PATENT DOCUMENTS

| | | | |
|---|---|---|---|
| 5,819,058 A * | 10/1998 | Miller et al. | 712/210 |
| 5,890,009 A | 3/1999 | Luick et al. | |
| 5,941,984 A | 8/1999 | Mohri et al. | |
| 6,157,996 A * | 12/2000 | Christie et al. | 712/218 |
| 6,564,265 B2 | 5/2003 | Tillmann et al. | |
| 6,658,551 B1 | 12/2003 | Berenbaum et al. | |
| 7,096,343 B1 | 8/2006 | Berenbaum et al. | |
| 7,181,595 B1 | 2/2007 | Siska | |
| 7,366,874 B2 | 4/2008 | Seong et al. | |
| 7,523,295 B2 | 4/2009 | Codrescu et al. | |
| 7,526,633 B2 | 4/2009 | Codrescu et al. | |
| 7,590,824 B2 | 9/2009 | Ahmed et al. | |

(Continued)

FOREIGN PATENT DOCUMENTS

| | | |
|---|---|---|
| EP | 0426393 A2 | 5/1991 |
| JP | H03147021 A | 6/1991 |

(Continued)

OTHER PUBLICATIONS

International Search Report and Written Opinion—PCT/US2011/026815—ISA/EPO—Apr. 26, 2011.

(Continued)

*Primary Examiner* — John Lindlof
(74) *Attorney, Agent, or Firm* — Peter Michael Kamarchik; Kenneth Vu

(57) ABSTRACT

A system and method of processing a hierarchical very long instruction word (VLIW) packet is disclosed. In a particular embodiment, a method of processing instructions is disclosed. The method includes receiving a hierarchical VLIW packet of instructions and decoding an instruction from the packet to determine whether the instruction is a single instruction or whether the instruction includes a subpacket that includes a plurality of sub-instructions. The method also includes, in response to determining that the instruction includes the subpacket, executing each of the sub-instructions.

28 Claims, 9 Drawing Sheets

(56) References Cited

U.S. PATENT DOCUMENTS

| | | |
|---|---|---|
| 2002/0042871 A1 | 4/2002 | Yoshida |
| 2002/0120914 A1 | 8/2002 | Gupta et al. |
| 2004/0049664 A1 | 3/2004 | Drabenstott et al. |
| 2004/0073776 A1 | 4/2004 | Hussain |
| 2004/0181648 A1 | 9/2004 | Jacobs et al. |
| 2006/0259740 A1* | 11/2006 | Hahn et al. .................. 712/210 |
| 2007/0266229 A1* | 11/2007 | Plondke et al. ............. 712/241 |
| 2009/0049276 A1 | 2/2009 | Bergland et al. |
| 2009/0245430 A1* | 10/2009 | Budianu .......... H03M 13/2957 375/340 |

FOREIGN PATENT DOCUMENTS

| | | |
|---|---|---|
| JP | H0926878 A | 1/1997 |
| JP | H09292991 A | 11/1997 |
| JP | H10222368 A | 8/1998 |
| JP | H117387 A | 1/1999 |
| JP | 2002533815 A | 10/2002 |
| WO | WO0022515 A1 | 4/2000 |
| WO | 0038082 A1 | 6/2000 |
| WO | WO2006102664 A2 | 9/2006 |
| WO | WO2007133893 | 11/2007 |

OTHER PUBLICATIONS

Intel® Itanium® 2 Processor Hardware Developer's Manual, Jul. 2002, 72 pages.

Kim, Jinhwan et al. "Code Optimizations for a VLIW-Style Network Processing Unit," Software—Practice and Experience, Apr. 2004, pp. 847-874.

\* cited by examiner

SYSTEM AND METHOD OF PROCESSING HIERARCHICAL VERY LONG INSTRUCTION PACKETS

I. FIELD

The present disclosure is generally related to encoding a hierarchical very long instruction word.

II. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

To speed up computing and reduce program size and consequent program storage need, it would be helpful to pack instructions more efficiently. By packing the instructions more efficiently, instruction cache size can be reduced, or the same instruction cache size can hold more instructions.

III. SUMMARY

In a particular embodiment, a method of processing instructions is disclosed. The method includes receiving a packet of instructions. The packet includes at least one instruction that may be decoded to determine whether the instruction is a single instruction or whether the instruction includes a subpacket that includes a plurality of sub-instructions. The method also includes, in response to determining that the instruction includes the subpacket, executing each of the sub-instructions.

In another particular embodiment, the method of processing instruction includes receiving a packet of instructions, where the packet includes a first instruction having a first parse value and a second instruction having a second parse value. The method includes routing the first instruction to a first execution unit and identifying the second instruction as a sub-packet instruction that includes a first sub-instruction and a second sub-instruction. The method also includes routing the first sub-instruction to a second execution unit.

In another particular embodiment, a processor is disclosed. The processor includes a decoder to receive a packet of instructions. The decoder is operative to decode an instruction within the packet to determine whether the instruction is a first sub-packet instruction that includes a first sub-instruction and a second sub-instruction. The processor also includes an execution unit to execute the instruction or to execute the first sub-instruction.

One particular advantage provided by at least one of the disclosed embodiments is that instruction cache size can be reduced because instructions are packed more densely. An advantage to efficient packing of instructions is an ability to store more instructions in the same amount of cache. Another advantage provided by at least one of the disclosed embodiments is a reduction in energy needed to fetch code from memory because each packet includes a higher density of instructions, resulting in a reduction in total number of calls to retrieve instructions to execute a program.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
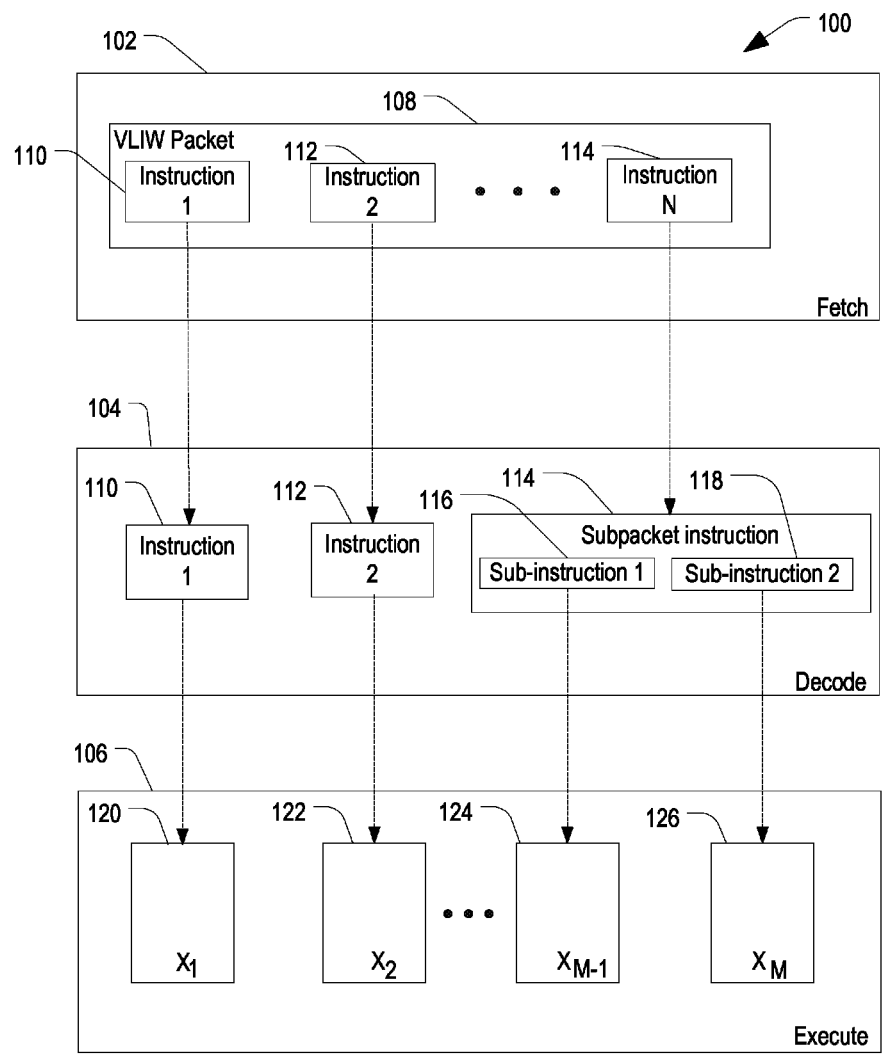
FIG. 1 is a block diagram of a particular illustrative embodiment of a very long instruction word (VLIW) packet entering a pipelined processor.

Referring to FIG. 1, a particular illustrative embodiment of a very long instruction word (VLIW) packet is disclosed. The VLIW packet 108 includes N instructions including a first instruction 110, a second instruction 112, and additional instructions up to an $N^{th}$ instruction 114. At a fetch stage 102 of a pipelined processor 100, the VLIW packet 108 is initially fetched from storage (not shown) and enters a decode stage 104 of the pipelined processor 100.

At the decode stage, 104 the instruction 114 is identified as a subpacket instruction that includes sub-instructions 116 and 118. From the decode stage 104, the plurality of N instructions in the VLIW packet 108 proceeds to an execute stage 106. The execute stage 106 includes M execution units including execution units 120, 122, 124, and 126. In a particular illustrative embodiment, M may exceed N. In another particular illustrative embodiment, M may be less than N. In another particular illustrative embodiment, M may be equal to N.

At the execute stage 106, the first instruction 110 enters execution unit 120. The second instruction 112 enters execution unit 122. The first sub-instruction 116 enters execution unit 124, and the second sub-instruction 118 enters execution unit 126. In a particular illustrative embodiment, each of the other instructions in the VLIW packet 108 can enter a corresponding execution unit at the execute stage 106.

In a particular illustrative embodiment, one or more of the instructions in the VLIW packet 108 are sub-packet instructions that include two or more sub-instructions. A VLIW packet that includes one or more sub-instruction packets is referred to as a hierarchical VLIW. In the illustrative embodiment shown in FIG. 1, each of the sub-instructions 116 and 118 enters a different execution unit and the sub-instructions 116 and 118 are executed concurrently. Alternatively, each of the sub-instructions 116 and 118 may be routed to a single execution unit that executes both sub-instructions 116 and 118.

In a particular illustrative embodiment, a VLIW packet includes multiple subpacket instructions, and each sub-packet instruction includes two or more sub-instructions. In a particular illustrative embodiment a subpacket instruction can be decoded to identify a sub-sub-packet of instructions (not shown), where a sub-subpacket includes a plurality of instructions that are referred to as sub-sub-instructions. In another particular illustrative embodiment, each instruction of a VLIW packet comprises a very long instruction word that includes one or more nested instructions, at least one of which is a sub-packet instruction that includes two or more sub-instructions.

There are M execution units at the execute stage 106. When the number M is large enough to accommodate each instruction of the VLIW packet including instructions 110, 112, and sub-instructions 116, and 118, M is greater than N and all of the instructions of the VLIW packet 108 can be executed concurrently. An advantage to concurrent processing of all instructions in the VLIW packet 108 is faster processing compared with sequential processing of some of the instructions included in the VLIW packet 108.

Figure 2:
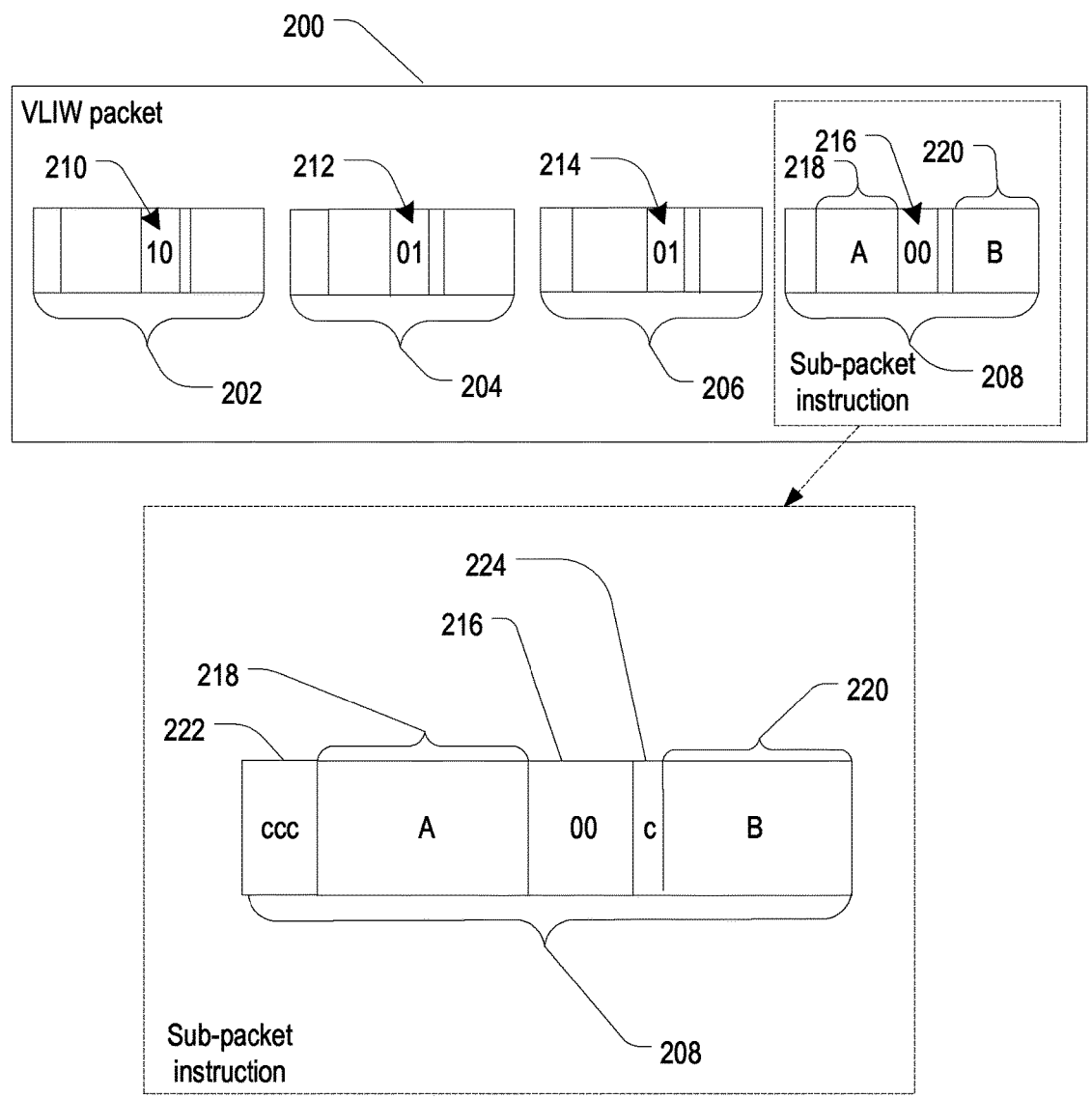
FIG. 2 is a block diagram of a particular illustrative embodiment of a VLIW packet that includes a sub-packet instruction.

Referring to FIG. 2, a particular illustrative embodiment of a VLIW packet is disclosed and generally designated 200. The VLIW packet 200 includes instructions 202, 204, 206, and 208. Each of the instructions 202, 204, 206, and 208 typically includes a fixed number of bits. For example, each of the instructions 202, 204, 206, and 208 may contain 32 bits. Each of the instructions can include a parse field. In a particular illustrative embodiment, the parse field includes two bits. In a particular illustrative embodiment, a first parse value is stored at two adjacent internal bits of a first instruction and a second parse value is stored at two adjacent internal bits of a second instruction. For example, a parse value of 01 is stored at two adjacent internal bits of the instruction 206, and a parse value of 00 is stored at two adjacent internal bits of the instruction 208. In a particular illustrative embodiment, the parse field is located at the centermost bits of the corresponding instruction. As an example of parse fields, the instruction 202 includes a parse field 210 with a stored value of 10, the instruction 204 includes a parse field 212 with a stored value of 01, the instruction 206 includes a parse field 214 with a stored value of 01, and the instruction 208 includes a parse field 216 with a stored value of 00.

A parse field can be an indicator of whether the instruction is an end-of-packet instruction. In a particular example, a parse field of 10 indicates that the packet is not an end-of-packet and also indicates that the packet is at an end of a hardware loop. In a particular illustrative example, a parse field having a value of 01 indicates an instruction that is not an end-of-packet. In a particular illustrative example, a parse field having a value of 11 indicates an end-of-packet instruction. In a particular embodiment, an instruction with a parse field having a value of 00 also indicates an end-of-packet instruction. An instruction with a parse field having a value of 00 also indicates that the instruction is a sub-packet instruction. A sub-packet instruction is an instruction that includes two or more sub-instructions.

A parse field can be an indicator of whether the instruction is an end-of-packet instruction. In a particular example, a parse field of 10 indicates that the instruction is not an end-of-packet instruction and also indicates that the instruction is at an end of a hardware loop. In a particular illustrative example, a parse field having a value of 01 indicates an instruction that is not an end-of-packet instruction. In a particular illustrative example, a parse field having a value of 11 indicates an end-of-packet instruction. In a particular embodiment, an instruction with a parse field having a value of 00 also indicates an end-of-packet instruction. An instruction with a parse field having a value of 00 also indicates that the instruction is a sub-packet instruction. A sub-packet instruction is an instruction that includes two or more sub-instructions.

In addition to sub-instructions 218 and 220, the instruction 208 includes a first instruction class field 222 and a second instruction class field 224. The instruction class fields 222 and 224 can indicate a type of instruction, such as load, store, arithmetic, etc. The contents of instruction class fields 222 and 224 can be useful at a decode stage of a pipelined processor.

In a particular illustrative embodiment, the instruction 208 includes 32 bits, each sub-instruction 218 and 220 includes 13 bits, the parse field 216 includes 2 bits, the first instruction class field 222 includes 3 bits, and the second instruction class field 224 includes 1 bit.

In a particular illustrative embodiment, the sub-instructions 218 and 220 are executed concurrently at an execute stage of a pipelined processor. In another particular illustrative embodiment, the sub-instructions 218 and 220 are executed serially at an execute stage of a pipelined processor.

Figure 3:
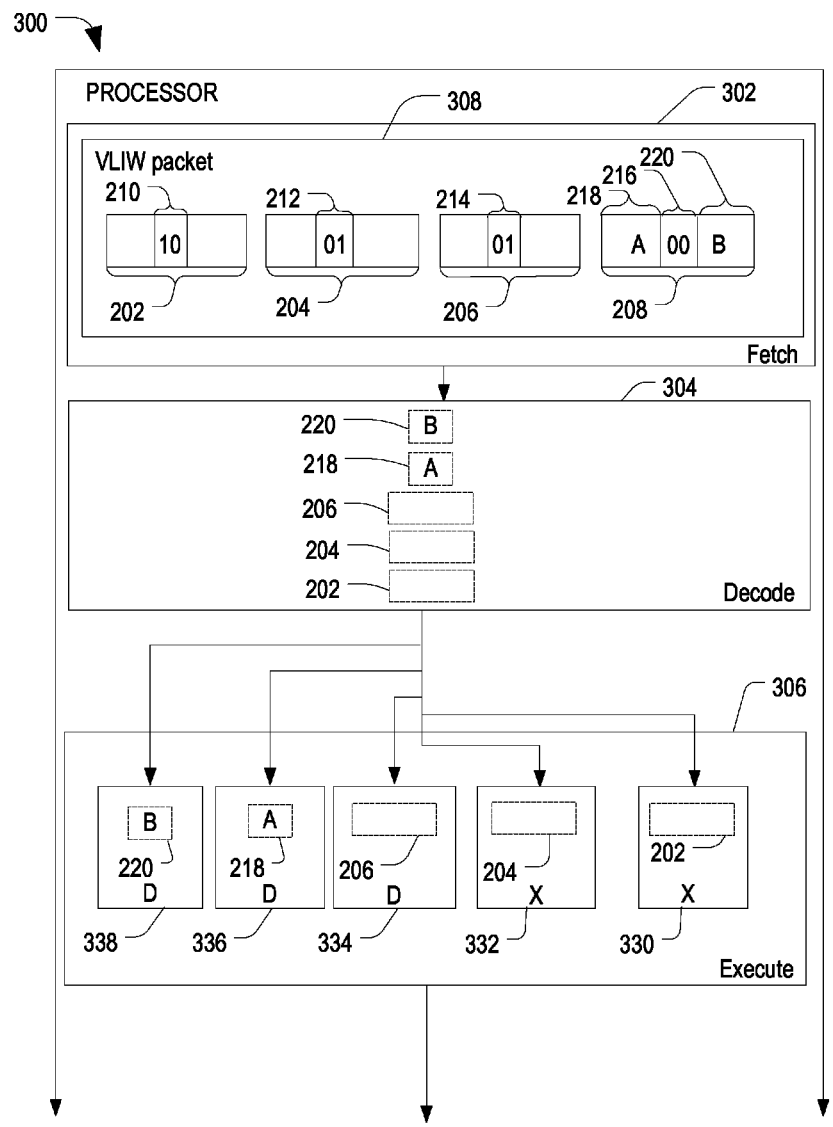
FIG. 3 is a block diagram of a particular illustrative embodiment of a pipelined processor processing a VLIW packet that includes a sub-packet instruction.

Referring to FIG. 3, a particular illustrative embodiment of a pipelined processor is disclosed and is generally designated 300. The pipelined processor 300 includes a plurality of stages. FIG. 3 shows three stages: a fetch stage 302, a decode stage 304, and an execute stage 306. In alternative embodiments, the pipelined processor 300 may include other stages such as a write-back stage. In a particular illustrative example, an instruction packet 308 is fetched at the fetch stage 302. The instruction packet 308 is decoded at the decode stage 304, after which a plurality of instructions included in the instruction packet 308 is sent to the execute stage 306, where each of the instructions is executed.

In a particular illustrative example, the instruction packet 308 includes the instructions 202, 204, 206, and 208. In a particular illustrative embodiment, the instruction packet 308 is retrieved from a tightly coupled memory (not shown) associated with the processor 300. In another particular illustrative embodiment, the instruction packet is retrieved from an instruction cache (not shown) associated with the processor 300. In a particular illustrative embodiment, each of the instructions 202, 204, 206, and 208 of the instruction packet 308 has a same size (i.e., includes a same number of bits). In a particular illustrative embodiment, each of the instructions 202, 204, 206, and 208 has the size of 32 bits.

In a particular illustrative embodiment, the instruction packet 308 is a very long instruction word (VLIW) packet. One of the instructions in the VLIW packet 308, such as the instruction 208, is a sub-packet instruction that includes a first sub-instruction 218 and a second sub-instruction 220.

Each of the instructions 202, 204, 206, and 208 includes a parse field. The instruction 202 includes a parse field 210, which in the example shown in FIG. 3 has a value of 10, signifying that the instruction 202 is not an end of packet instruction and that the instruction 202 is an end of hardware loop instruction. The instructions 204 and 206 have corresponding parse fields 212 and 214, each of which has a value of 01, signifying that the corresponding instruction is not an end-of-packet instruction. The instruction 208 is a subpacket instruction and includes a parse field 216 with a value of 00, signifying that the instruction 208 is a sub-packet instruction and also signifying that the instruction 208 is an end-of-packet instruction. In a particular illustrative embodiment, the instruction 208 includes two sub-instructions 218 and 220, each of which has a size that is smaller (i.e., includes a smaller number of bits) than the instruction 316.

At the decode stage 304, the VLIW instruction packet 308 is decoded into the instructions 202, 204, 206, and the sub-instructions 218 and 220. Each instruction may be evaluated to determine whether the instruction is an executable instruction or a subpacket instruction that includes multiple sub-instructions. For example, the contents of the parse field 216 may be compared to a predetermined value that indicates a subpacket instruction. Instructions that are not indicated as subpacket instructions may be immediately routed to the execute stage. Instructions that are determined to be subpacket instructions may be decoded into their component sub-instructions (e.g. sub-packet instructions 218 and 220). In some embodiments the sub-instructions are then routed to the execution stage 306 in parallel. Sub-instructions may be executed in parallel in a single execution unit or in multiple execution units. In other embodiments the sub-instructions are routed serially. The execute stage 306 may be configured to determine whether to execute the sub-instructions serially or in parallel based on available processor resources.

Moving to the execute stage 306, in a particular illustrative example, each of the instructions leaving the decode stage enters a corresponding execution unit. The instruction 202 enters execution unit 330, the instruction 204 enters execution unit 332, the instruction 206 enters execution unit 334, the sub-instruction 218 enters execution unit 336 and the sub-instruction 220 enters execution unit 338. In a particular illustrative embodiment, all of the instructions 202, 204, 206, 218, and 220 are executed concurrently. In the illustrative embodiment of FIG. 3, the execution units 334, 336, and 338 execute data cache-related instructions such as load and store instructions, while the execution units 330 and 332 are arithmetic execution units, e.g., arithmetic logic unit (ALU). After execution, the output of each execution unit proceeds to provide results during a write-back stage (not shown).

In a particular embodiment, all of the instructions in the VLIW packet may be executed in parallel. For example, all of the instructions may be executed in parallel by the processor 300, or else a fault will occur. In another particular embodiment, a sub-instruction (e.g. 218 or 220) may be executed after the other instructions in the VLIW packet have been executed, when the processor 300 does not have sufficient resources to execute the instructions 202, 204, 206 and the sub-instructions 218 and 220 in parallel.

In a particular embodiment, a position of an instruction within the VLIW packet determines which execution unit will receive the instruction. For example, in FIG. 3 the instruction 202 is a first instruction of the VLIW packet 308 and is routed to the execution unit 330, the second instruction 204 is routed to the execution unit 332, and the third instruction 206 is routed to the execution unit 334.

The VLIW packet may therefore indicate to the processor which instructions to process in parallel and to which execution unit each instruction is to be routed. In such embodiments, the processor may not be permitted to process instructions within a single packet over multiple cycles, or to route an instruction to an execution unit other than the execution unit indicated by the instruction's position in the VLIW packet.

Because a total number of instructions packed in a VLIW packet that includes sub-instructions may be greater than the total number of instructions packed in a VLIW packet without sub-instructions, a total number of fetches to memory for program instructions can be reduced, with a consequent increase in computing time efficiency. Since each fetch has an energy cost, a reduction in the total number of fetches can result in reduced power consumption associated with executing a program.

Figure 4:
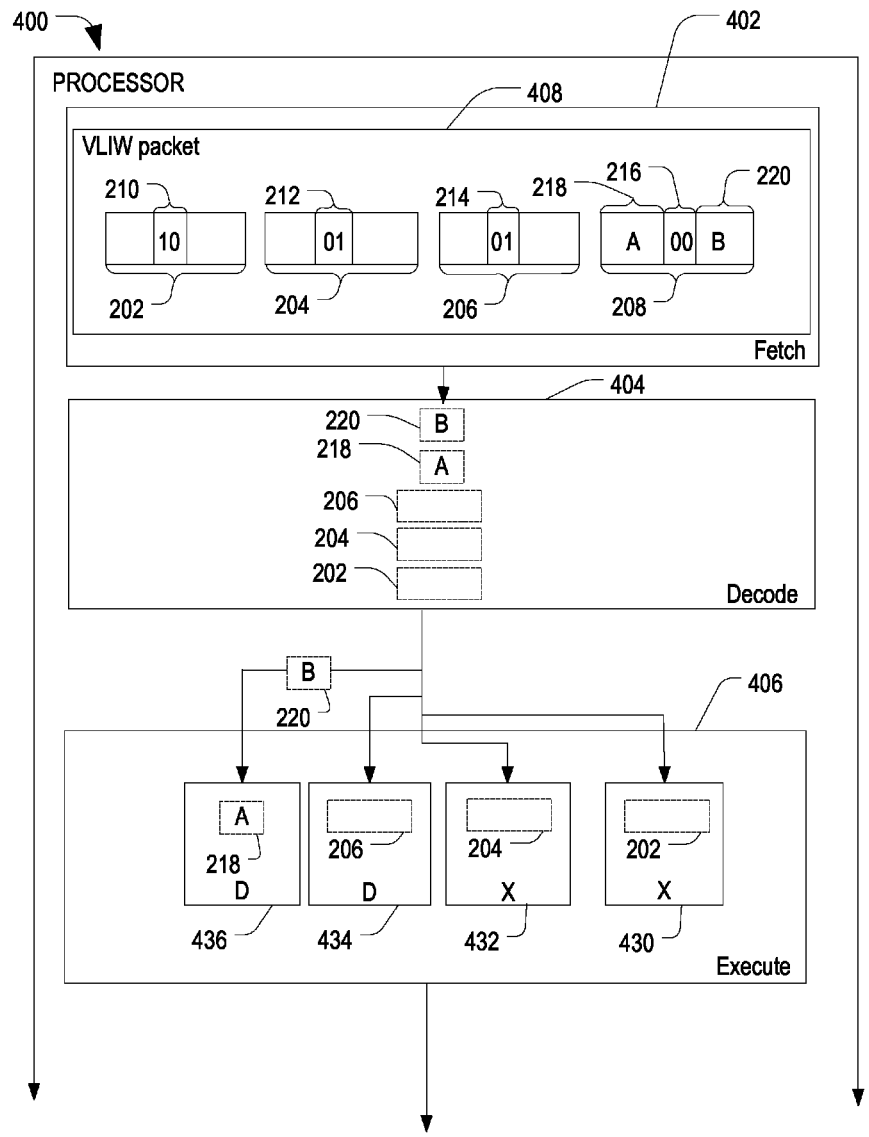
FIG. 4 is a block diagram of another particular illustrative embodiment of a pipelined processor that is processing a VLIW packet that includes a sub-packet instruction.

Referring to FIG. 4, a particular illustrative embodiment of a pipelined processor is disclosed and generally designated 400. The pipelined processor 400 includes a fetch stage 402, a decode stage 404, and an execute stage 406. Additional stages of the pipeline, including a write-back stage, are not shown. At a fetch-stage 402, a very long instruction word (VLIW) instruction 408 is fetched from memory such as an instruction cache or other memory. The VLIW instruction 408 includes four instructions 202, 204, 206, and 208. The instruction 202 includes a parse field 210 having a value of 10, the instruction 204 includes a parse field 212 having a value of 01, the instruction 206 includes a parse field 214 having a value of 01, and the instruction 208 includes a parse field 216 having a value of 00. The parse fields 210, 212, and 214 have values that indicate that their corresponding instructions are not end-of-packet instructions. The parse field 216 with the value of 00 indicates that the instruction 208 is a sub-packet instruction and that the instruction 208 is an end of packet instruction. The instruction 208 includes a first sub-instruction 218 and a second sub-instruction 220. The first sub-instruction 218 includes data indicated by A and the second sub-instruction 220 includes data indicated by B.

Proceeding to the decode stage 404, the VLIW packet 408 is separated into each of the instructions 202, 204, 206, and the two sub-instructions 218 and 220. Proceeding to the execute stage 406, there are four execution units: 430, 432, 434, and 436. In a particular illustrative embodiment, the execution units 430 and 432 execute arithmetic instructions (designated with a letter X), and the execution units 434 and 436 are data load and store execute units (designated with letter D). In a particular illustrative example, the instruction 202 is executed in the execution unit 430, the instruction 204 is executed in the execution unit 432, the instruction 206 is executed in the execution unit 434, and the first sub-instruction 218 is executed in the execution unit 436. The instructions 202, 204, 206, and the first sub-instruction 218 can be executed concurrently. After the first sub-instruction 218 is executed in the execution unit 436, the second sub-instruction 220 is executed in the execution unit 436 during a subsequent clock cycle. Thus, in the example depicted in FIG. 4, the sub-instructions 218 and 220 are executed serially in the execution unit 436. In another particular illustrative example (not shown in FIG. 4), the execution unit 436 is configured to enable concurrent execution of both sub-instructions 218 and 220. In this configuration instructions 202, 204, 206, 218, and 220 can be executed concurrently.

Figure 5:
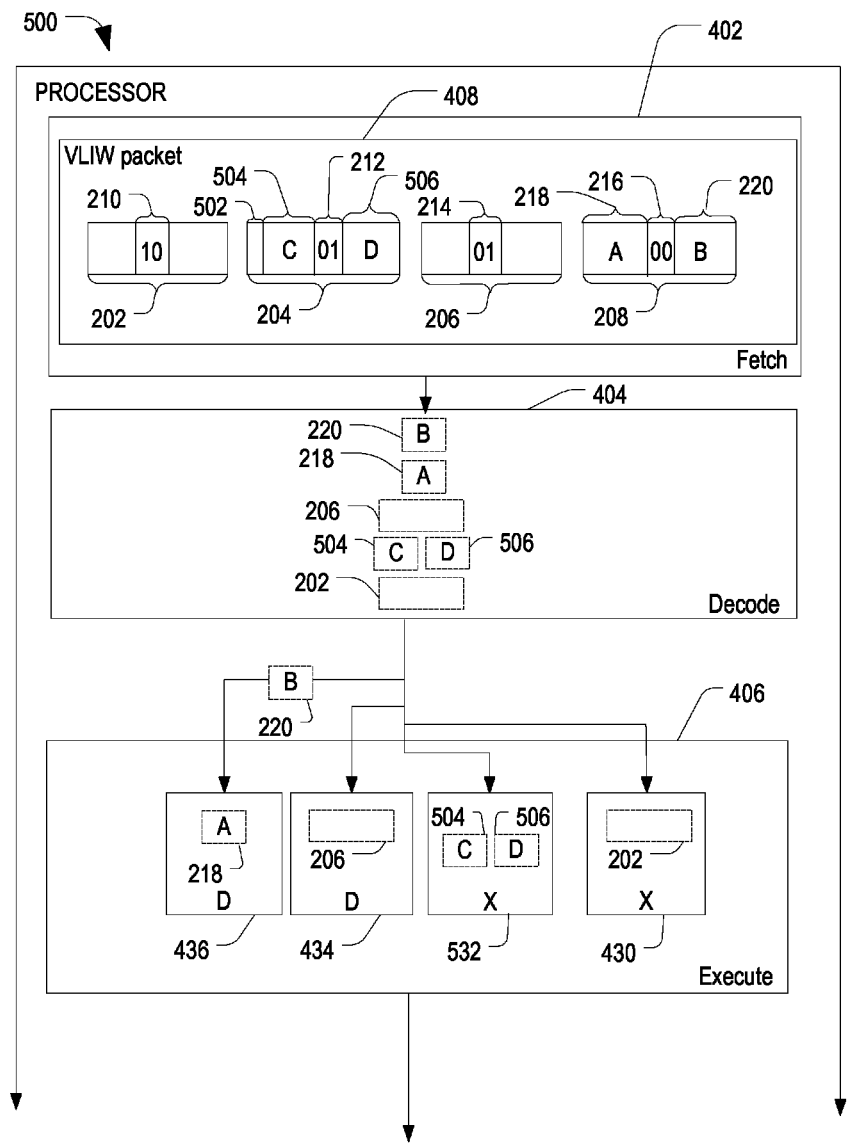
FIG. 5 is a block diagram of another particular illustrative embodiment of a pipelined processor that is processing a VLIW packet that includes a sub-packet instruction.

In yet another particular illustrative example illustrated FIG. 5, an indicator field 502 that is not a parse field, i.e., not within 210, 212, 214, or 216, can serve as an indicator that a particular instruction is a sub-packet instruction. For example, the instruction 204 can include the indicator field 502 that when set, indicates that the instruction 204 is a sub-packet instruction that includes a first sub-instruction C 504 and a second sub-instruction D 506. Alternatively, each instruction in the VLIW packet 408 may include a sub-packet indicator field. The sub-packet instruction 204 can be decoded at the decode stage 404 and the sub-instructions 504 and 506 can then be executed. In a particular illustrative example shown in FIG. 5, a processor 500 includes an execution unit 532 configured to execute two sub-instructions concurrently, enabling sub-instructions 504 and 506 to be executed concurrently with the instructions 202, 206, and the sub-instruction 218. In another particular illustrative example (not shown in FIG. 4 or FIG. 5), each of the execution units 532 and 436 is configured to execute two sub-instructions concurrently, enabling the sub-instructions 218 and 220 and the sub-instructions 504 and 506 to be executed concurrently with the instructions 202 and 206.

Figure 6:
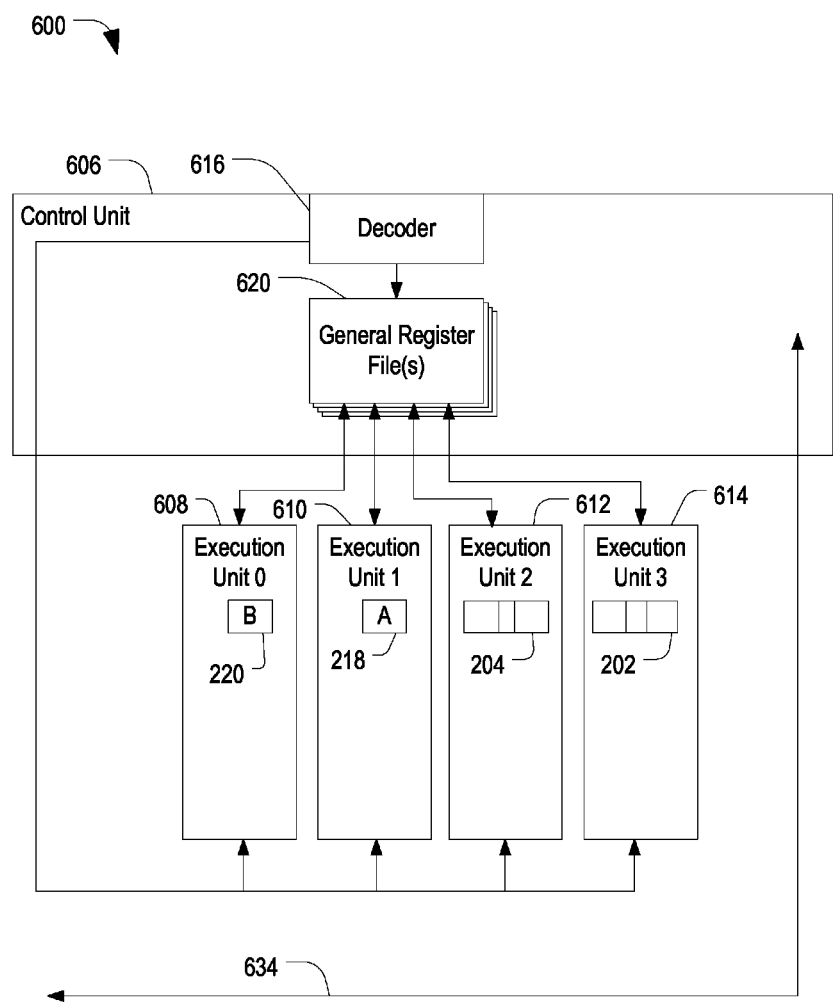
FIG. 6 is a block diagram of another particular illustrative embodiment of a pipelined processing unit that is processing a VLIW packet that includes a sub-packet instruction.

Referring to FIG. 6, a particular illustrative embodiment of a pipelined processor is disclosed and generally designated 600. The pipelined processor 600 includes a control unit 606 and execution units 608, 610, 612, and 614. The control unit 606 includes a decoder 616 and general register files 620.

In operation, a packet of instructions, such as a VLIW packet including a plurality of instructions, is retrieved and supplied to the control unit via a bus 634. The decoder 616 is operable to decode multiple instructions within a packet of instructions. The VLIW packet is unpacked into individual instructions at the decoder 616. The VLIW packet includes a plurality of instructions that includes an instruction 202, an instruction 204, and a sub-packet instruction that includes a sub-instruction 218 and a sub-instruction 220. In a particular illustrative embodiment, the sub-instructions 218 and 220 are instructions each of which is smaller in size (i.e., include fewer bits) than the sub-packet instruction in which they are packed in the VLIW packet.

After decoding the VLIW packet at the decoder 616, the decoded instructions are sent to the execute stage. Each of the instructions 202, 204, 218, and 220 enters a corresponding execution unit. As shown in FIG. 6, the instruction 202 is executed at the instruction unit 614, the instruction 204 is executed at the instruction unit 612, the sub-instruction 218 is executed at execution unit 610, and the sub-instruction 220 is executed at the instruction unit 608. Thus, in the example shown in FIG. 6, the instructions 202, 204, 218, and 220 are executed concurrently. After execution, output of each of the execution units 608, 610, 612, and 614 is written to the general register files 620. The output of the execution units 608, 610, 612, and 614 can also be sent to a storage memory via the bus 634.

Figure 7:
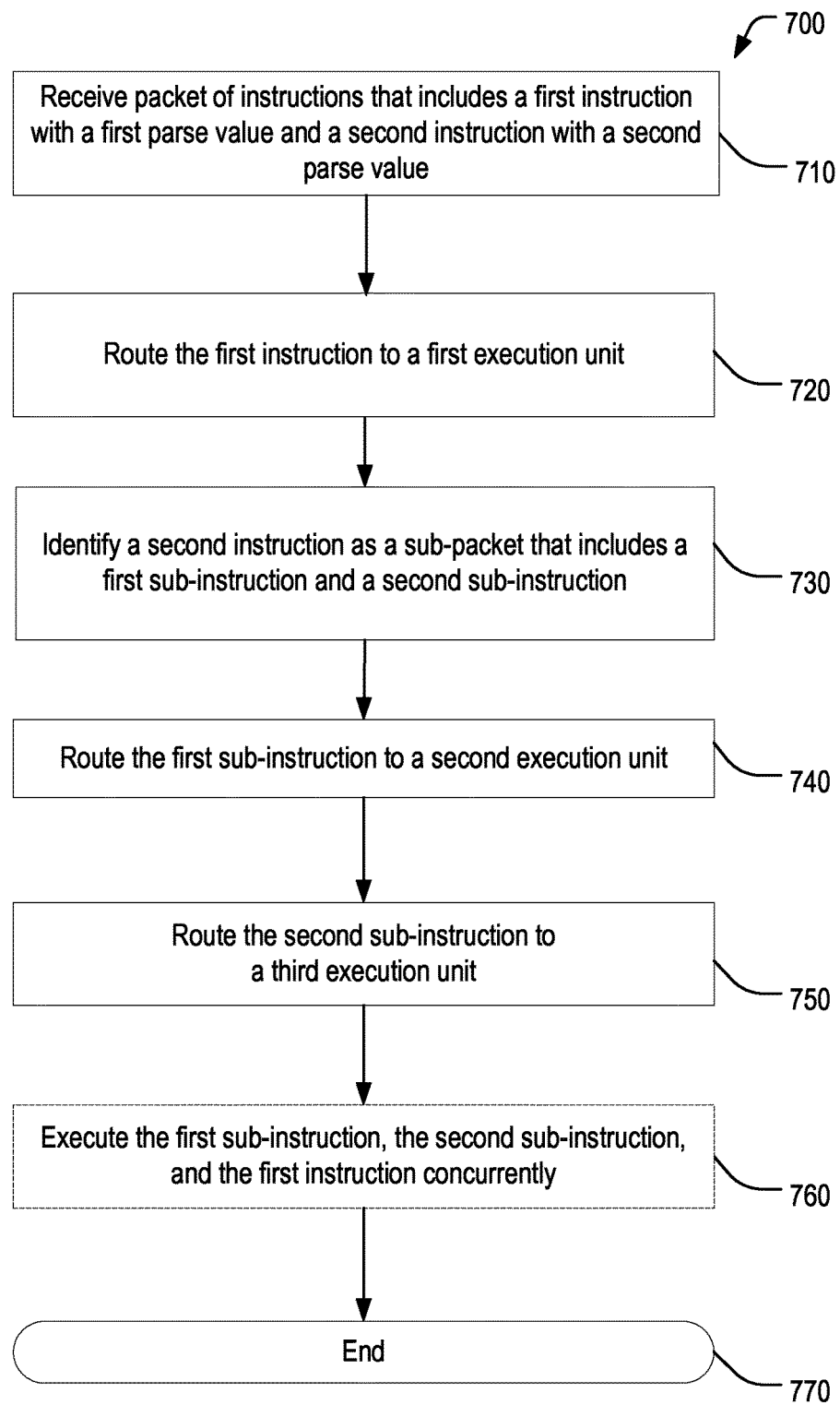
FIG. 7 is a flow chart of a particular illustrative embodiment of a method of processing a VLIW packet that includes a sub-packet instruction.

Referring to FIG. 7, a particular illustrative embodiment of a method of routing instructions is shown and generally designated 700. A packet of instructions that includes a first instruction with a first parse value and second instruction with a second parse value is received, at 710. For example, in FIG. 3, the instruction 206 has a parse field 214 with a first parse value of 01 and the instruction 208 has a parse field 216 with a second parse value of 00. In a particular illustrative embodiment, the packet of instructions is a VLIW packet. For example, in FIG. 3, the packet 308 is a VLIW packet. The first instruction is routed to a first execution unit, at 720. For example, in FIG. 3, the instruction 206 is routed to the execution unit 334. Proceeding to 730, the second instruction is identified as a sub-packet instruction that includes a first sub-instruction and a second sub-instruction. For example, in FIG. 3, the instruction 208 is identified as a subpacket instruction by the second parse value 00 in the parse field 216. The instruction 208 includes the first sub-instruction 218 and the second sub-instruction 220. Proceeding to 740, the first sub-instruction is routed to a second instruction unit. For example, in FIG. 3, the first sub-instruction 218 is routed to the instruction unit 336. Proceeding to 750, the second sub-instruction may be routed to a third execution unit. For example, in FIG. 3, the second sub-instruction 220 is routed to the instruction unit 338. Optionally, the first sub-instruction, the second sub-instruction, and the first instruction are executed concurrently, at 760. For example, in FIG. 3, the instruction 206 and the sub-instructions 218 and 220 are executed concurrently. The method ends at 770. In other embodiments, the second sub-instruction may be routed to the second instruction unit to be executed serially with the first sub-instruction.

Figure 8:
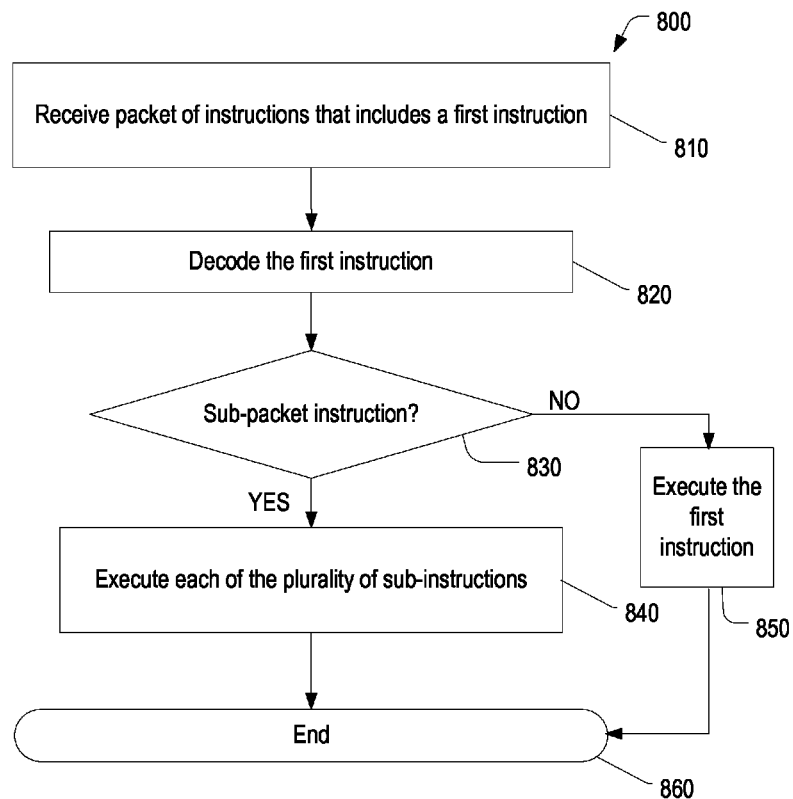
FIG. 8 is a flow chart of another particular illustrative embodiment of a method of processing a VLIW packet that includes a sub-packet instruction.

Referring to FIG. 8, a particular illustrative embodiment of a method of executing instructions is disclosed and generally designated 800. A packet of instructions that includes a first instruction is received, at 810. For example, in FIG. 3, the packet 308 includes the instruction 208. The first instruction is decoded, at 820. A determination is made as to whether the first instruction is a sub-packet instruction, at 830. When the first instruction is determined to be a first sub-packet instruction that includes a plurality of sub-instructions, the method proceeds to block 840. For example, in FIG. 3, the instruction 208 is a sub-packet instruction that includes the first sub-instruction 218 and the second sub-instruction 220. The first instruction includes a parse indicator identifying the first instruction as a sub-packet instruction and indicating an end-of-packet status of the first instruction. (Any of the instructions within the packet may be identified during decoding, via the value of its parse indicator, as a sub-packet instruction or via an alternative method of identifying a sub-packet instruction.) For example, in FIG. 3, the instruction 208 includes the parse indicator 216 having a value of 00, identifying the instruction 208 as a sub-packet instruction and indicating that the instruction 208 is an end-of-packet instruction. At block 840, each of the plurality of sub-instructions is executed. For example, in FIG. 3, the first sub-instruction 218 and the second sub-instruction 220 are executed. In a particular illustrative embodiment, all of the plurality of sub-instructions are executed concurrently. For example, in FIG. 3, the first sub-instruction 218 and the second sub-instruction 220 are executed concurrently. Returning to decision block 830, when the first instruction is not a sub-packet instruction, the first instruction is executed, at 850. For example, in FIG. 3, at the decode stage 304 it is determined that the instruction 206 is not a sub-packet instruction, and the instruction 206 proceeds from the decode stage 304 to the execute stage 306, where it is executed. The method ends at 860.

Figure 9:
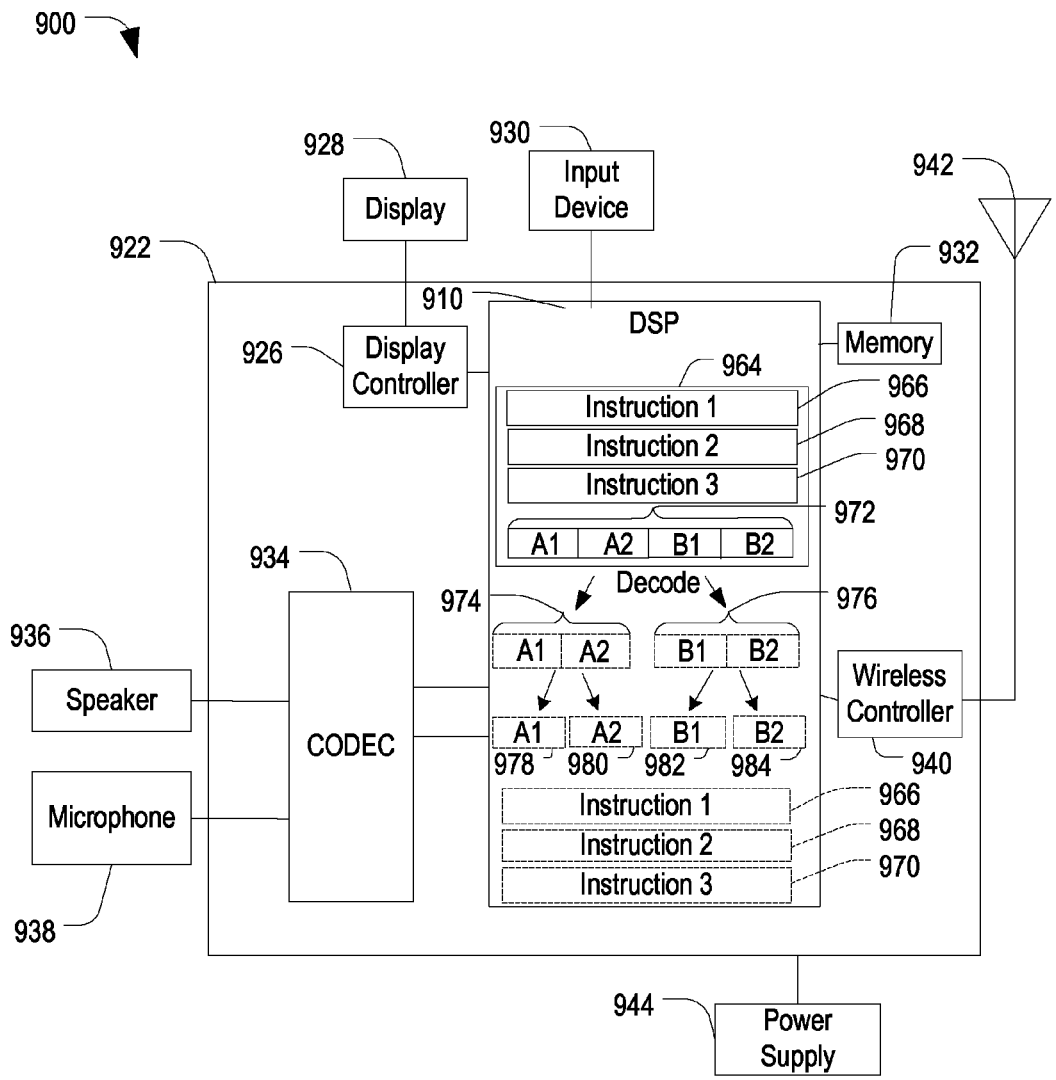
FIG. 9 is a block diagram of wireless device including a digital signal processor to process VLIW packets that include sub-instructions.

Referring to FIG. 9, a block diagram of a particular illustrative embodiment of a wireless device including a digital signal processor to process a VLIW packet that includes sub-instructions, is depicted and generally designated 900. The device 900 includes a processor, such as a digital signal processor (DSP) 910 to process a plurality of instructions in a VLIW packet 964. The VLIW packet 964 includes instructions 966, 968, 970, and 972. The VLIW packet 964 is a hierarchical instruction packet that includes a plurality of subpacket instructions. The VLIW packet 964 includes three levels of instructions in the hierarchy. Each subpacket instruction includes a plurality of sub-instructions. For example, the instruction 972 is a subpacket instruction (second level of the hierarchy) that includes sub-instructions 974 and 976. The sub-instruction 974 is a sub-subpacket instruction (third level of the hierarchy) that includes sub-sub-instructions 978 and 980, and the sub-instruction 976 is a sub-subpacket instruction (third level of the hierarchy) that includes sub-sub-instructions 982 and 984.

At a decode stage of the DSP 910, the VLIW packet 964 is decoded into the instructions 966, 968, 970, and 972. The subpacket instruction 972 is decoded into the sub-instructions 974 and 976. The sub-instruction 974 is decoded into the sub-sub-instructions 978 and 980, and the sub-instruction 976 is decoded into the sub-sub-instructions 982 and 984. In an illustrative example, the DSP 910 processes the instructions 966, 968, 970, 978, 980, 982, and 984 according to one or more of FIGS. 3-5, and according to one or more of the methods of FIGS. 6 and 7, or any combination thereof.

FIG. 9 also shows a display controller 926 that is coupled to the digital signal processor 910 and to a display 928. A coder/decoder (CODEC) 934 can also be coupled to the digital signal processor 910. A speaker 936 and a microphone 938 can be coupled to the CODEC 934.

FIG. 9 also indicates that a wireless controller 940 can be coupled to the digital signal processor 910 and to a wireless antenna 942. In a particular embodiment, the DSP 910, the display controller 926, the memory 932, the CODEC 934, and the wireless controller 940 are included in a system-in-package or system-on-chip device 922. In a particular embodiment, an input device 930 and a power supply 944 are coupled to the system-on-chip device 922. Moreover, in a particular embodiment, as illustrated in FIG. 9, the display 928, the input device 930, the speaker 936, the microphone 938, the wireless antenna 942, and the power supply 944 are external to the system-on-chip device 922. However, each of the display 928, the input device 930, the speaker 936, the microphone 938, the wireless antenna 942, and the power supply 944 can be coupled to a component of the system-on-chip device 922, such as an interface or a controller.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method of processing instructions, the method comprising:
   receiving a packet including at least a first instruction and a second instruction;
   decoding the first instruction to determine whether the first instruction comprises a plurality of sub-instructions based on a first indicator included in the first instruction;
   decoding the second instruction to determine whether the second instruction comprises a first sub-instruction and a second sub-instruction based on a second indicator included in the second instruction, wherein the second indicator is located subsequent to the first instruction in the packet;
   determining, based on the second indicator, that the second instruction comprises the first sub-instruction and the second sub-instruction;
   in response to determining that the second instruction comprises the first sub-instruction and the second sub-instruction, decoding the first sub-instruction to determine whether the first sub-instruction comprises a first sub-sub-instruction and a second sub-sub-instruction;
   determining that the first sub-instruction comprises the first sub-sub-instruction and the second sub-sub-instruction; and
   in response to determining that the first sub-instruction comprises the first sub-sub-instruction and the second sub-sub-instruction, executing at least the first sub-sub-instruction.

2. The method of claim 1, wherein the packet includes multiple sub-packet instructions, each sub-packet instruction including two or more sub-instructions, and wherein decoding the first instruction to determine whether the first instruction comprises the plurality of sub-instructions is further based on a plurality of class fields included in the first instruction.

3. The method of claim 1, wherein the first instruction, the second instruction, or both include a corresponding instruction class field that is used to identify an instruction type.

4. The method of claim 1, wherein the packet is a very long instruction word (VLIW) packet, wherein the VLIW packet includes a plurality of instructions, and wherein each instruction of the plurality of instructions includes a corresponding indicator.

5. The method of claim 1, further comprising executing the first sub-instruction at a first execution unit based on a location of the first sub-instruction with respect to other instructions in the packet.

6. The method of claim 1, wherein the packet includes a third instruction comprising a third sub-instruction and a fourth sub-instruction, and further comprising executing the first sub-instruction, the second sub-instruction, and the third sub-instruction concurrently during a first clock cycle and executing the fourth sub-instruction during a second clock cycle.

7. The method of claim 1, wherein the packet includes multiple instructions, and wherein each instruction of the multiple instructions comprises a very long instruction word (VLIW) instruction.

8. The method of claim 2, wherein the first indicator comprises a parse indicator, wherein the first instruction includes a plurality of bits, wherein the parse indicator includes two centermost bits of the plurality of bits, wherein the plurality of class fields includes a three-bit class field and a one-bit class field, and wherein the first indicator is located between the three-bit class field and the one-bit class field.

9. The method of claim 1, wherein the first indicator and the second indicator are not located in a header of the packet, wherein each instruction and each sub-instruction in the packet are executed concurrently.

10. The method of claim 1, wherein the first indicator identifies that the first instruction comprises one or more of an end of packet instruction, a not end of packet instruction, an end of hardware loop instruction, or a sub-packet instruction including two or more sub-instructions.

11. The method of claim 10, wherein the second indicator identifies that the second instruction comprises at least two of an end of packet instruction, a not end of packet instruction, an end of hardware loop instruction, or a sub-packet instruction including two or more sub-instructions.

12. The method of claim 1, wherein a particular value of the second indicator identifies that the second instruction is located at an end of the packet and that the second instruction comprises the first sub-instruction and the second sub-instruction.

13. The method of claim 1, wherein each instruction and each sub-instruction in the packet are executed concurrently based on a number of execution units being greater than or equal to a total number of instructions and sub-instructions.

14. The method of claim 1, wherein a first length associated with each sub-instruction is less than half of a second length associated with each instruction.

15. The method of claim 1, wherein each instruction comprises thirty-two bits, and wherein each sub-instruction comprises thirteen bits.

16. The method of claim 1, wherein a particular value of the first indicator identifies the first instruction as an end of a hardware loop instruction and not an end of packet instruction.

17. The method of claim 1, wherein the second indicator comprises a parse indicator, wherein the second instruction includes a plurality of bits, wherein the parse indicator includes two internal adjacent bits of the plurality of bits, and wherein a particular value of the second indicator identifies that the second instruction comprises the first sub-instruction and the second sub-instruction and identifies that the second instruction comprises at least one of an end of packet instruction, a not end of packet instruction, or an end of hardware loop instruction.

18. A method of processing instructions, the method comprising:

receiving a packet of instructions, wherein the packet includes a plurality of instructions;

decoding each instruction of the plurality of instructions to determine whether each instruction is a single instruction or whether each instruction includes a plurality of sub-instructions, wherein each instruction includes an indicator that identifies whether the instruction includes the plurality of sub-instructions;

in response to determining that a first instruction of the plurality of instructions includes a first sub-instruction and a second sub-instruction, decoding each sub-instruction to determine whether each sub-instruction includes a plurality of sub-sub-instructions; and in response to determining that the first sub-instruction includes a first sub-sub-instruction and a second sub-sub-instruction, executing at least the first sub-sub-instruction.

19. The method of claim 18, further comprising routing the first instruction to a first execution unit, wherein the first execution unit includes an arithmetic execution unit or a load/store data unit.

20. The method of claim 18, further comprising:
routing the second sub-instruction to a first execution unit;
routing the first sub-sub-instruction to a second execution unit; and
executing the second sub-instruction and the first sub-sub-instruction concurrently during a first clock cycle.

21. The method of claim 18, further comprising:
routing the second sub-instruction to a third execution unit; and
executing the first sub-sub-instruction and the second sub-sub-instruction concurrently during a first clock cycle.

22. A processor comprising:
a decoder operative to:
receive a packet including a first instruction and a second instruction;
decode the first instruction to determine whether the first instruction comprises a plurality of sub-instructions based on a first indicator included in the first instruction;
decode the second instruction to determine whether the second instruction comprises a first sub-instruction and a second sub-instruction based on a second indicator included in the second instruction, wherein the second indicator is located subsequent to the first instruction in the packet; and
in response to determining that the second instruction comprises the first sub-instruction and the second sub-instruction, decoding the first sub-instruction to determine whether the first sub-instruction comprises a first sub-sub-instruction and a second sub-sub-instruction; and
a first execution unit configured to execute the first sub-sub-instruction.

23. The processor of claim 22, further comprising a second execution unit configured to execute the second sub-sub-instruction, wherein the first sub-sub-instruction is routed to the first execution unit based on a location of the first sub-sub-instruction in the packet, and wherein the second sub-sub-instruction is routed to the second execution unit based on a location of the second sub-sub-instruction in the packet.

24. The processor of claim 22, further comprising a third execution unit configured to execute the first instruction in response to the first instruction comprising a single instruction.

25. An apparatus comprising:
means for determining whether a first instruction comprises a plurality of sub-instructions based on a first indicator included in the first instruction and whether a second instruction comprises a first sub-instruction and a second sub-instruction based on a second indicator included in the second instruction, wherein the first instruction and the second instruction are included in a packet, and wherein the second indicator is located subsequent to the first instruction in the packet;
means for decoding the first sub-instruction to determine whether the first sub-instruction comprises a first sub-sub-instruction and a second sub-sub-instruction; and
means for executing the first sub-sub-instruction and the second sub-sub-instruction in response to the first sub-instruction comprising the first sub-sub-instruction and the second sub-sub-instruction.

26. The apparatus of claim 25, wherein a particular value of the first indicator identifies the first instruction as not an end of hardware loop instruction and not an end of packet instruction.

27. A non-transitory computer readable medium comprising instructions that, when executed by a processor, cause the processor to:
decode a first instruction and a second instruction included in a packet;
determine whether the first instruction comprises a plurality of sub-instructions based on a first indicator included in the first instruction;
determine whether the second instruction comprises a first sub-instruction and a second sub-instruction based on a second indicator included in the second instruction, wherein the second indicator is located subsequent to the first instruction in the packet;
in response to determining that the second instruction comprises the first sub-instruction and the second sub-instruction, decoding the first sub-instruction to determine whether the first sub-instruction comprises a first sub-sub-instruction and a second sub-sub-instruction; and
in response to determining that the first sub-instruction comprises the first sub-sub-instruction and the second sub-sub-instruction, initiate execution of the first sub-sub-instruction and the second sub-sub-instruction.

28. The non-transitory computer readable medium of claim 27, wherein the instructions further cause the processor to:
route the first sub-sub-instruction to a first execution unit; and
route the second sub-sub-instruction to the first execution unit or to a second execution unit based on a location of the second sub-sub-instruction in the packet.

* * * * *